Patented Apr. 24, 1945

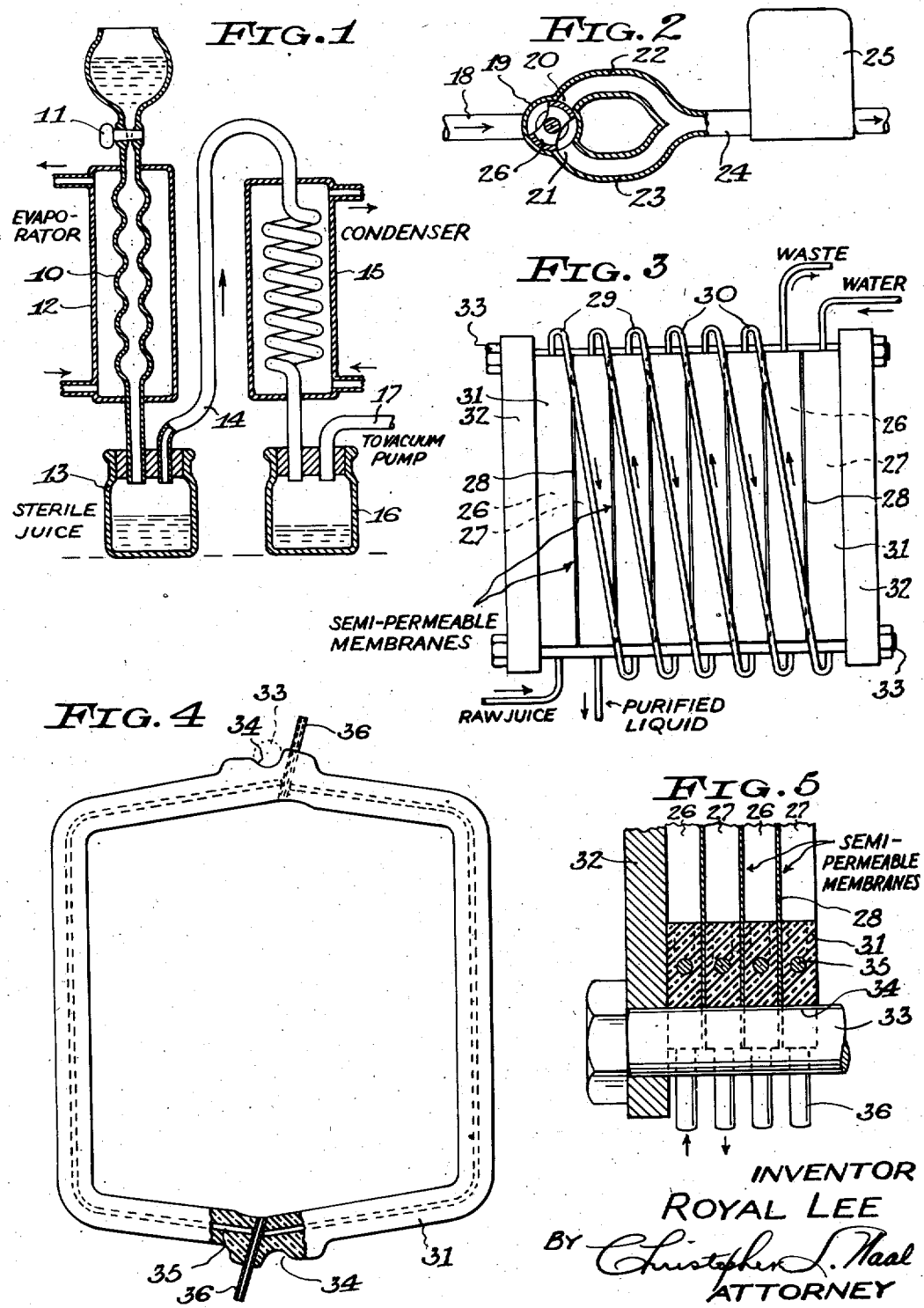

2,374,219

UNITED STATES PATENT OFFICE 2,374,219

PRESERVATION OF LIQUID FOODS

Royal Lee, Milwaukee, Wis., assignor to Lee Foundation for Nutritional Research, Milwaukee, Wis., a corporation of Wisconsin Application July 3, 1940, Serial No. 343,847

5 Claims. (Cl. 99—155)

The present invention relates to the preservation of perishable liquid substances, more particularly liquid foods such as fruit and vegetable juices.

An object of the invention is to provide a method of concentrating and sterilizing food juices and the like without materially altering their natural characteristics, such as flavor, nutrient value and vitamin content.

Another object of the invention is to provide an improved method of producing a sterilized dry substance from a juice.

A further object is to provide improved apparatus for effecting the preservation of the liquid substances.

The invention further consists in the several features hereinafter described and claimed.

In the accompanying drawing,

Fig. 1 is a diagrammatic view of a vacuum type evaporating apparatus for concentrating juice and for removing a sterilizing liquid therefrom, parts of the apparatus being shown in section;

Fig. 2 is a diagrammatic view of an apparatus for sterilizing juice by the application of ultrasonic waves, parts of the apparatus being shown in section;

Fig. 3 is a diagrammatic side elevation of an apparatus for dialyzing the juice;

Fig. 4 is an elevation of a dialyzer frame element, and

Fig. 5 is a fragmentary sectional elevation of the dialyzer.

The invention is applicable to the preservation of a wide variety of perishable liquid substances and more particularly fruit and vegetable juices, for example, orange juice, grape juice, carrot juice, sugar-cane juice, and sorghum juice.

By way of example, the invention will be explained in connection with the treatment of a fruit juice such as orange juice.

It is first desirable to deaerate the juice, as by subjecting the juice to a vacuum. This removes the dissolved gases, especially oxygen, which might otherwise cause deterioration of the juice, such as loss of flavor and color and destruction of vitamins.

The juice is then partially dehydrated, preferably by freezing. Most of the water is thus segregated as ice, and most of the pulp and other suspended solids are trapped in the ice. The ice mass is crushed and is centrifuged to remove the concentrated juice. This treatment avoids filtration difficulties which would otherwise be encountered as the colloidal material of the juice would tend to clog a filter. Moreover, it is not desirable to remove this material as the flavor and food values of orange juice and other fruit juices are present to a considerable extent in the suspended materials. It is desirable to conduct the freezing and centrifuging in an oxygen-free atmosphere, such as of nitrogen or carbon dioxide.

The concentrated juice is then sterilized in one or more of various ways hereinafter set forth which will avoid heating the juice to pasteurizing temperature and thereby minimize deterioration of the juice. In some instances, the juice is further concentrated to a dry substance, as hereinafter described.

One method of sterilizing involves the use of certain volatile organic solvents such as chloroform and toluene, or mixtures thereof, the solvents being suitably dispersed through the juice, as by shaking or emulsifying. The action of these solvents is to dissolve the cell walls of microorganisms. Only a relatively small quantity of these solvents is required, say 1 to 5% of the juice by volume, and slightly in excess of the amount required for solution of the soluble materials of the juice. The solvent is subsequently removed from the juice, as by the use of a vacuum still or evaporator, the solution being kept below pasteurizing temperature. Preferably the solvent is recovered for reuse. In certain cases some of the water content of the juice will also be removed along with the solvent, and can be separated therefrom in various ways, as by fractional distillation. In order to facilitate dispersion of the sterilizing solvent through the juice, the solvent may first be dissolved in a small quantity of another solvent, preferably ethyl alcohol, freely miscible in water. Methyl alcohol may also be used for this purpose. The proportions are not critical, but by way of example the amount of alcohol may be 1 to 5 times the quantity of sterilizing solvent and when so used it preferably constitutes 40 to 80% of the solution. Ethyl alcohol acts as a protein coagulator, but this is not objectionable in a low protein juice such as orange juice.

Another method of sterilizing consists in destroying the micro-organisms by subjecting the concentrated juice to mechanical wave energy. This will produce "cavitation" or mechanical destruction of the micro-organisms.

Still another method of sterilization consists in treating the juice with high frequency electrical energy, preferably in the range of frequencies corresponding to 1 to 30 meters wave length. This treatment can be effected by passing the juice between plate electrodes for a short period, such as one to five minutes. The energy is applied either in a band of frequencies or by varying the frequency during the period of treatment, in order to insure destruction of various molds and other microorganisms having different lethal frequencies. The juice is cold during this treatment, or at least below the pasteurizing temperature.

A further method of sterilization consists in dialyzing or filtering the juice. This can be done only in the case of a juice such as sugar-cane juice, where the colloidal constituents are relatively unimportant and their loss can be tolerated.

The concentrated sterile juice produced by the various treatments above described may be bottled or marketed as such, or it may be passed through a spray drier to provide a dry powder, as when a raw sugar is desired from cane juice. The drying is preferably effected in an atmosphere free of oxygen. In the case of fruit juices, the powder form obviates the transportation of water, and insures good keeping qualities. The fruit juice powder is useful in making confections, or it may be reconstituted into a liquid by the addition of water. If desired, the powder may be pressed into tablets or pellets.

Spray drying of liquids has heretofore involved the application of sufficient heat to sterilize the product. When sterilization is accomplished with volatile solvents, they are easily removed in the spraying process without other steps and at a temperature below the pasteurizing temperature.

In Fig. 1 of the drawing there is shown a vacuum evaporating apparatus for removing the sterilizing solvent from the juice, and for further concentrating the juice. This apparatus includes a corrugated tube 10 through which the sterile juice solution flows downwardly in a film along the inner walls of the tube, the rate of flow into the tube being controlled by a valve 11. The tube has a jacket 12 through which water or other heating medium is passed in an upward direction. The temperature of the water is below pasteurizing temperature, but is sufficiently high, say about 125° F., to produce evaporation of the solvent at a reasonably rapid rate. Some of the water content of the juice will also be evaporated. The tube 10 has its bottom or discharge end connected to a vessel 13 which receives the sterile concentrated juice. A conduit 14 extends from the vessel 13 to a condenser 15 from which the condensate flows into a vessel 16. A conduit 17 leads from the vessel 16 to any suitable vacuum pump, not shown.

An apparatus for sterilizing the juice by the application of mechanical wave energy is shown in Fig. 2. A conduit 18 admits the liquid at high pressure and high velocity into a valve chamber 19 having two outlet ports 20 and 21 communicating with respective branch conduits 22 and 23 which merge into a single outlet conduit 24, the latter discharging into a receiving tank 25 in which a suitable pressure is maintained. A rotary valve 26 mounted in the chamber 19 rotates at high speed and admits the liquid alternately into the branch conduits 22 and 23, setting up mechanical waves in the branch conduits to sterilize the juice therein.

The dialyzing apparatus shown in Figs. 3 to 5 serves to sterilize and filter the juice. This apparatus includes a series of dialyzing cells 26 and 27 separated by semi-permeable membranes 28, the cells 26 and 27 being arranged in alternate relation. The cells 26 are serially connected by conduits 29 and the cells 27 are serially connected by conduits 30. The incoming raw juice, either normal or concentrated, enters a cell 26 at one end of the series, while sterile water is admitted to the cell 27 at the other end of the series. The raw juice flows through the cells 26 in succession and the soluble constituents thereof pass through the membranes into the intervening cells 27, whereas any micro-organisms present are prevented from passing into the latter cells. The waste of the juice is finally discharged from the last cell 26. The incoming sterile water flows through the cells 27 in counterflow relation to the cells 26 and gradually acquires the soluble constituents of the raw juice, the purified liquid or juice being finally discharged from the last cell 27.

The cells are formed by a pack of parallel loop-shaped frames 31 and the membranes 28, the assembly being completed by end plates 32 which are secured in position by clamping bolts 33. Each frame is provided at opposite ends with bolt-receiving notches 34 which serve to retain the frames in alignment. The frames are formed of rubber or other suitable material and are reinforced by imbedded metal rods 35, such as of Monel metal or stainless steel. The use of rubber or other suitable material for the frames avoids the necessity for gaskets. Metal inlet and outlet tubes 36 of stainless steel or other suitable metal are molded into the opposite ends of the frames. The thickness of each frame is relatively small. In many instances the semi-permeable membranes may be formed of collodion, "Cellophane" or similar materials instead of animal membranes. The liquid in each cell flows from one end of the frame to the other, and the liquid in adjacent cells flows in opposite directions. A sufficient number of cells is provided to minimize loss of soluble materials in the waste liquid.

In cases where the juice is reduced to a dried substance, such as powdered or granular mass, it is sometimes desirable to sterilize the dried substance instead of sterilizing the juice. In such cases the juice is dried, as by spray drying or other process, at a temperature below the pasteurizing temperature. The dried substance is then mixed with a small quantity of a volatile liquid sterilizing agent, such as one or more of the agents above mentioned, a sufficient amount of the liquid being added to dampen or saturate the dried substance. Preferably, a sterilizing liquid is used which will not appreciably dissolve the dried substance. The sterilizing liquid is then evaporated from the resulting product, as in a rotary drier, at a temperature below the pasteurizing temperature, the product being agitated in the drier. The liquid may also be removed by subjecting the product to a vacuum, and supplying heat to facilitate evaporation, the temperature, however, being well below the pasteurizing point. Instead of using a liquid sterilizing agent, a gaseous sterilizing agent may be used, such as formaldehyde and methyl formate. Preferably, the dried substance is subjected to a vacuum before treatment with these sterilizing agents in order to insure thorough penetration. In some instances it is desirable to aerate the sterilized dried substance in order to remove all traces of the liquid or gaseous sterilizing agent.

While certain ways of carrying out the invention have been described above, it will be understood that changes and modifications may be made without departing from the spirit and scope of the invention as expressed by the appended claims.

What I claim as new and desire to secure by Letters Patent is:

1. The method of preserving a food juice which consists in dispersing therein an organic sterilizing solvent, and then simultaneously evaporating the solvent from the sterilized juice and drying the juice.

2. The method of preserving a food juice which consists in dispensing therein a volatile organic sterilizing solvent, and then spray-drying the sterilized juice at a temperature below the pasteurizing temperature of the juice.

3. The method of preserving a food juice which consists in dispersing therein an organic sterilizing solvent, and then subjecting the sterilized juice to a drying operation to remove the solvent and to convert the juice to a dry substance.

4. The method of preserving a food juice which consists in dispersing therein an organic sterilizing solvent which is relatively insoluble in water, and then evaporating the solvent from the sterilized juice and drying the juice.

5. The method of preserving a food juice which consists in adding thereto an organic sterilizing solvent selected from a group consisting of chloroform and toluene and dissolved in an organic solvent freely miscible with water, and then removing the solvents from the sterilized juice and drying the juice.

ROYAL LEE.

---

CERTIFICATE OF CORRECTION.

Patent No. 2,374,219.  April 24, 1945.

ROYAL LEE.

It is hereby certified that error appears in the printed specification of the above numbered patent requiring correction as follows: Page 1, second column, line 40, for "solvent" read --solvent. In some instances, ethyl alcohol can be used alone for sterilizing--; page 3, first column, line 9, claim 2, for "dispensing" read --dispersing--; and that the said Letters Patent should be read with this correction therein that the same may conform to the record of the case in the Patent Office.

Signed and sealed this 31st day of July, A. D. 1945.

Leslie Frazer (Seal)  Acting Commissioner of Patents.

What I claim as new and desire to secure by Letters Patent is:

1. The method of preserving a food juice which consists in dispersing therein an organic sterilizing solvent, and then simultaneously evaporating the solvent from the sterilized juice and drying the juice.

2. The method of preserving a food juice which consists in dispensing therein a volatile organic sterilizing solvent, and then spray-drying the sterilized juice at a temperature below the pasteurizing temperature of the juice.

3. The method of preserving a food juice which consists in dispersing therein an organic sterilizing solvent, and then subjecting the sterilized juice to a drying operation to remove the solvent and to convert the juice to a dry substance.

4. The method of preserving a food juice which consists in dispersing therein an organic sterilizing solvent which is relatively insoluble in water, and then evaporating the solvent from the sterilized juice and drying the juice.

5. The method of preserving a food juice which consists in adding thereto an organic sterilizing solvent selected from a group consisting of chloroform and toluene and dissolved in an organic solvent freely miscible with water, and then removing the solvents from the sterilized juice and drying the juice.

ROYAL LEE.

---

CERTIFICATE OF CORRECTION.

Patent No. 2,374,219.     April 24, 1945.

ROYAL LEE.

It is hereby certified that error appears in the printed specification of the above numbered patent requiring correction as follows: Page 1, second column, line 40, for "solvent" read --solvent. In some instances, ethyl alcohol can be used alone for sterilizing--; page 3, first column, line 9, claim 2, for "dispensing" read --dispersing--; and that the said Letters Patent should be read with this correction therein that the same may conform to the record of the case in the Patent Office.

Signed and sealed this 31st day of July, A. D. 1945.

Leslie Frazer (Seal)     Acting Commissioner of Patents.